US012600598B2

(12) United States Patent
De Piano et al.

(10) Patent No.: US 12,600,598 B2
(45) Date of Patent: Apr. 14, 2026

(54) ELEVATOR SYSTEM HAVING A LASER DISTANCE MEASURING DEVICE

(71) Applicant: Inventio AG, Hergiswil (CH)

(72) Inventors: Domenico De Piano, Kriens (CH); Faruk Osmanbasic, Sins (CH); Titus Bucher, Lucerne (CH); Michael Thalmann, Kriens (CH)

(73) Assignee: INVENTIO AG, Hergiswil (CH)

( * ) Notice: Subject to any disclaimer, the term of this patent is extended or adjusted under 35 U.S.C. 154(b) by 1333 days.

(21) Appl. No.: 17/309,402

(22) PCT Filed: Dec. 2, 2019

(86) PCT No.: PCT/EP2019/083265
§ 371 (c)(1),
(2) Date: May 25, 2021

(87) PCT Pub. No.: WO2020/126429
PCT Pub. Date: Jun. 25, 2020

(65) Prior Publication Data
US 2022/0002113 A1     Jan. 6, 2022

(30) Foreign Application Priority Data

Dec. 18, 2018    (EP) .................................... 18213312

(51) Int. Cl.
*B66B 1/34*        (2006.01)
*G01S 7/481*       (2006.01)
*G01S 17/08*       (2006.01)
(52) U.S. Cl.
CPC .......... *B66B 1/3492* (2013.01); *G01S 7/4814*
(2013.01); *G01S 17/08* (2013.01)

(58) Field of Classification Search
CPC ...... B66B 1/3492; G01S 7/4814; G01S 17/08
See application file for complete search history.

(56) References Cited

U.S. PATENT DOCUMENTS

| | | | |
|---|---|---|---|
| 5,151,562 A | 9/1992 | Fujita et al. | |
| 6,079,521 A * | 6/2000 | Schonauer ............ | B66B 1/3492 187/393 |
| 2016/0139269 A1* | 5/2016 | Yamazaki ............... | G01S 17/88 356/4.01 |

FOREIGN PATENT DOCUMENTS

| | | |
|---|---|---|
| DE | 10126585 A1 | 5/2002 |
| JP | 2007119102 A | 5/2007 |
| JP | 2010116229 A | 5/2010 |

* cited by examiner

*Primary Examiner* — Bickey Dhakal
(74) *Attorney, Agent, or Firm* — Shumaker, Loop & Kendrick, LLP

(57) ABSTRACT

An elevator system includes an elevator car and a laser distance measuring device. The elevator car is moved along a travel path that is delimited at the top by an upper boundary and at the bottom by a lower boundary. The laser distance measuring device emits a laser beam and determines a distance to a position at which the laser beam impinges on an object. The laser distance measuring device is mounted on the elevator car such that the laser beam can be directed upward to the upper boundary in a first configuration and can be directed downward to the lower boundary in a second configuration. A current position of the elevator car can thereby be determined in a redundant manner. Furthermore, in a third configuration, lateral distances to boundary markers can be measured to read out information that is codified by the boundary markers.

12 Claims, 1 Drawing Sheet

11 DRIVE MACHINE
15 ELEVATOR CONTROLLER
25 LASER

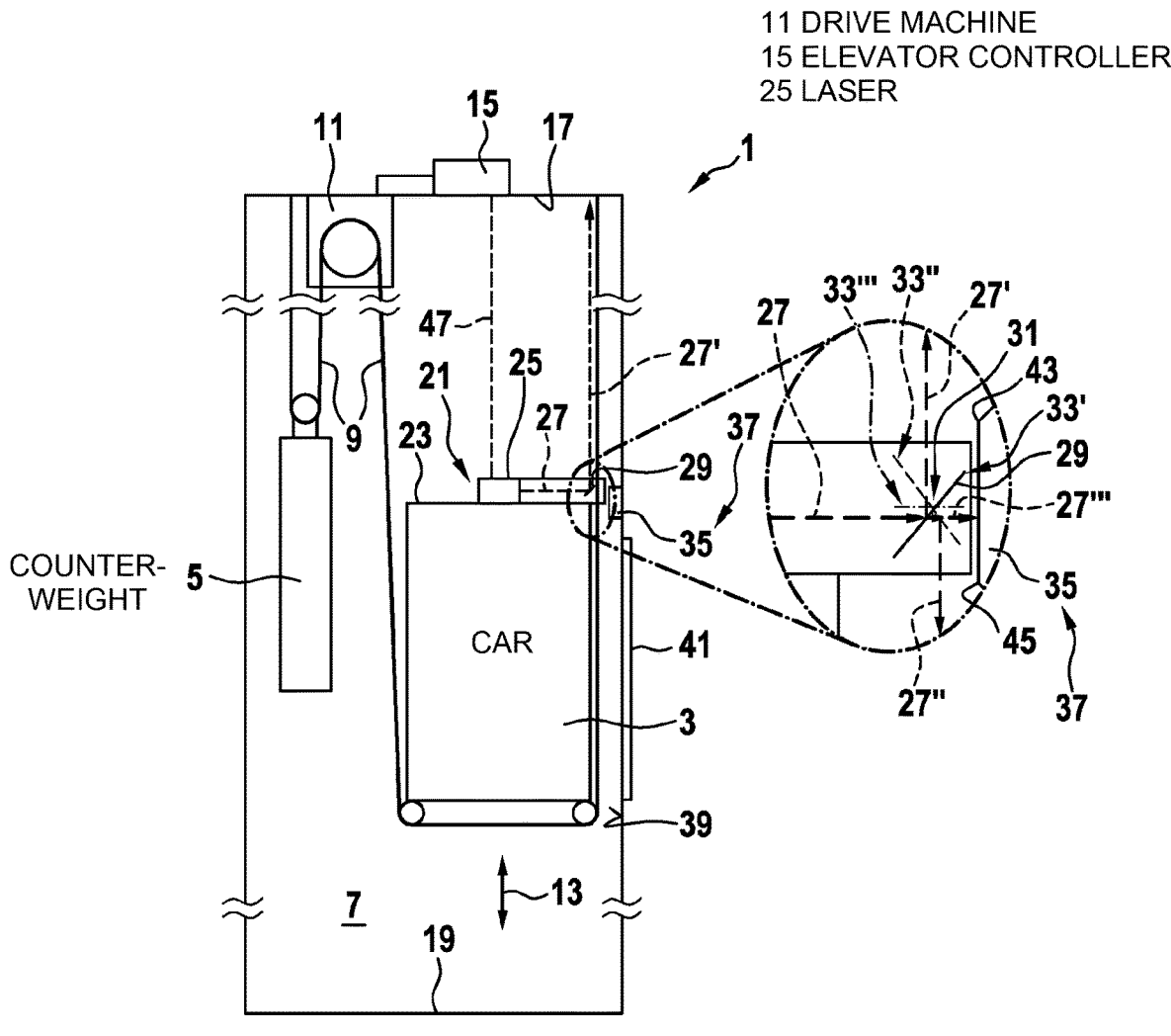
11 DRIVE MACHINE
15 ELEVATOR CONTROLLER
25 LASER

ELEVATOR SYSTEM HAVING A LASER DISTANCE MEASURING DEVICE

FIELD

The present invention relates to an elevator system. In particular, the invention relates to determining a current position of an elevator car in an elevator system.

BACKGROUND

In elevator systems, elevator cars are moved along a mostly substantially vertical travel path in order to convey passengers and/or transport goods located in said cars between different height positions. In this case, an elevator car is moved by means of a drive machine. The drive machine is controlled by an elevator controller.

During operation of an elevator system, a current position of the elevator car of said system should always be known with sufficient accuracy. Corresponding position information can be required by the elevator controller, for example, in order to be able to precisely move the elevator car to a desired height position by suitably controlling the drive machine. For example, the elevator car should be able to move to a particular floor in a building and be able to be positioned there in such a way that the base of the car is flush with a base of the floor.

Various approaches have been developed in order to be able to precisely measure the current height position of an elevator car in an elevator system.

For example, elevator systems are known in which, parallel to the travel path of the elevator car at a plurality of height positions, information about the respective height positions is stored in such a way that it can be recorded automatically by a readout device carried along with the elevator car.

For example, a magnetic tape can extend parallel to the travel path of the elevator car, i.e. for example on a wall of an elevator shaft, and coding can be stored on the magnetic tape at every position such that clear information about the relevant height position can be derived when the coding is read out. However, this approach requires that the magnetic tape be laid parallel to the entire travel path of the elevator car, which can involve considerable effort, particularly in the case of very tall elevator systems. Moreover, it is generally necessary that the position information stored on the magnetic tape must first be "learned" by the elevator system before said system is put into operation. For this purpose, the elevator car can be moved carefully and therefore very slowly along the entire travel path in a so-called learning run. During the learning run, position information that can be important for later operation of the elevator system, such as positions at which the elevator car should stop at a floor or the start and end positions of the travel path, can then be learned. Carrying out learning runs of this kind can, however, involve a considerable expenditure of time and/or work, particularly in the case of tall elevator systems.

Alternatively, approaches have been presented in which the current position of an elevator car can be measured by means of a laser distance measuring device. For example, DE 101 26 585 A1 describes a radiation-based, contactless position reference system for elevators and a method therefor.

However, it has now been recognized that determining the position of an elevator car by means of a laser distance measuring device is usually not sufficiently reliable and/or sufficiently precise in all cases.

SUMMARY

There may be a need, inter alia, for an elevator system in which the current position of an elevator car can be determined with high reliability and/or high precision.

A need of this kind can be met by an elevator system according to the advantageous embodiments defined and specified in the following description.

According to one aspect of the invention, an elevator system is proposed which has an elevator car and a laser distance measuring device. The elevator car can be moved along a travel path. The travel path is delimited at the top by an upper boundary and at the bottom by a lower boundary. The laser distance measuring device is configured to emit a laser beam and to determine a distance to a position at which the laser beam impinges on an object. In this case, the laser distance measuring device is mounted on the elevator car and configured such that the laser beam can be directed upward to the upper boundary in a first configuration and can be directed downward to the lower boundary in a second configuration. In this way, a distance to the upper boundary can be determined in the first configuration and a distance to the lower boundary can be determined in the second configuration.

Possible features and advantages of embodiments of the invention may be considered, inter alia and without limiting the invention, to be based upon the concepts and findings described below.

Laser distance measuring devices, which are sometimes also referred to as laser rangefinders, are able to measure distances precisely, quickly and contactlessly. For this purpose, the laser distance measuring device emits one or more laser beams and then detects light that is reflected or backscattered from an object on which the laser beam impinges. The distance to the object can then be inferred from the detected light.

There are various principles for inferring the distance between the object and the laser distance measuring device. For example, a delay time that the laser beam requires to reach the object and get back to the laser distance measuring device can make it possible to confirm the distance between the two components. Alternatively, a phase shift between part of a laser beam that is directed toward the object and from said object back again to the laser distance measuring device and part of the same laser beam that is directed along a path of known length, for example within the laser distance measuring device, can make it possible to confirm the distance between the laser distance measuring device and the object. As a further alternative, triangulation can be used to be able to determine distances to an object.

It has already been proposed to use laser distance measuring devices to measure distances within an elevator system. For example, a laser distance measuring device can be positioned on the elevator car of an elevator system or at a reference position within an elevator shaft of the elevator system in order to then be able to measure a current distance between the elevator car and the reference position by means of the laser distance measuring device. For example, a laser distance measuring device mounted on a roof of the elevator car can be used to measure a current distance to a ceiling of the elevator shaft. Alternatively, a laser distance measuring device mounted under a base of the elevator car can be used to measure a current distance to a base in a pit of the elevator shaft. In principle, the distances can also be measured in the opposite direction, i.e. from the ceiling of the elevator shaft or the pit of the elevator shaft to the elevator car.

However, it has now been recognized that, in certain situations, there may be disturbances when determining the current position of the elevator car by means of a laser distance measuring device. For example, the development of smoke within part of the elevator shaft can lead to the laser beam used for distance measurement being partially or completely absorbed and thus position determination being falsified or even impossible.

It is therefore proposed to develop the elevator system in such a way that, when it is possible to determine the current position of the elevator car by means of a laser distance measuring device, a certain redundancy is introduced and the risk of errors or failures in the position determination can thus be reduced.

For this purpose, it is proposed that only a single laser distance measuring device is preferably provided in the elevator system and that said device is mounted on the elevator car. In this case, the laser distance measuring device is intended to be mounted on the elevator car in such a way, i.e. in particular in such a position, and configured in such a way that the laser beam emitted by said device for distance measurement can be directed both upward to an upper boundary of the travel path of the elevator car and downward to a lower boundary of this travel path. In other words, the laser distance measuring device mounted on the elevator car is intended to be able to direct its laser beam, optionally past the elevator car, both upward to an upper end of the travel path of the elevator car and downward to a lower end of the travel path of the elevator car. In this way, a distance to the upper boundary is determined in the first configuration and a distance to the lower boundary is determined in the second configuration. The upper boundary of the travel path can be, for example, a ceiling of an elevator shaft. Alternatively, the upper boundary can be defined by components that protrude into the elevator shaft below this ceiling. In a similar way, the lower boundary of the travel path can be a base in the region of a pit of the elevator shaft or, alternatively, can be defined by components that protrude into the elevator shaft there. The upper and lower boundaries are thus objects on which said laser beam impinges and to which the laser distance measuring device can measure the distance.

Since dimensions within the elevator system and in particular dimensions relating to the travel path of the elevator car are generally known in advance, it is possible to infer the current position of the elevator car both from the measurement of the distance between the laser distance measuring device and a reference point on the upper boundary of the travel path and from a measurement of the distance between the laser distance measuring device and a reference point on the lower boundary of the travel path.

The position determination thus obtains the desired redundancy. Disturbances that only impair one of the two distance measurements, such as local smoke development within an elevator shaft, therefore no longer endanger the entire determination of the position of the elevator car.

According to one embodiment, the laser distance measuring device can comprise a mirror that can be moved at least between a first mirror position and a second mirror position in order to align the laser beam in the first mirror position in the first configuration and to align the laser beam in the second mirror position in the second configuration.

In other words, a mirror can be provided in the laser distance measuring device, by means of which mirror a laser beam generated in the laser distance measuring device can be deflected in different directions in different configurations. The mirror can be moved between at least two mirror positions. In a first mirror position, the laser beam is directed upward toward the upper boundary of the travel path of the elevator car in accordance with the first configuration mentioned above. In a second mirror position, however, the laser beam is directed downward toward the lower boundary of the travel path in accordance with the second configuration.

The use of a mirror to deflect a laser beam is technically easy to implement and allows a quick and/or precise change between the two configurations.

According to one specific embodiment, the mirror can be rotated about a horizontal axis of rotation in order to be moved between the first mirror position and the second mirror position.

In other words, the movement of the mirror in order to deflect the laser beam in different directions can take place in the form of a rotation of the mirror. In this case, the mirror can have a relatively small reflective surface that only needs to correspond to or be slightly larger than the surface area of the laser beam to be deflected. The reflective surface can be planar. A small and/or planar mirror of this kind can be easily oriented in different directions with high precision and thereby deflect the laser beam. For example, a mirror of this kind can be deflected using a galvanometer drive. Overall, the laser beam generated by the laser distance measuring device can thus be quickly and precisely deflected using the rotatable mirror and thus aligned from the first configuration into the second configuration and vice versa.

In addition to the possibility of deflecting a laser beam by means of a preferably single mirror, there are also other possibilities for specifically changing the direction of such a laser beam. For example, other optical systems such as single or multiple optical lenses, single or multiple optical grids or a combination of optical components of this kind with one another or with one or more mirrors can be used to deflect laser beams.

Furthermore, it is also conceivable to use a mirror to deflect the laser beam, but not to move it by means of a rotation between the first and the second mirror position but by means of a different type of movement. For example, the mirror can have a plurality of mirror surfaces aligned in differently oriented planes, so that the mirror can then be moved in a translational manner in order to move one of these mirror surfaces into the beam path of the laser beam as required and thus align the laser beam in the first configuration or the second configuration.

According to one embodiment of the invention, the laser distance measuring device can also be configured such that, in a third configuration, the laser beam can be directed toward a lateral boundary next to the travel path, whereby a distance to the lateral boundary can be determined in the third configuration.

In other words, in addition to its ability to selectively direct the laser beam upward or downward, the laser distance measuring device can also be capable of directing the laser beam laterally toward the lateral boundary that is next to the travel path of the elevator car.

In other words, in addition to the first and second configurations in which the laser beam is aligned substantially in a vertical direction, a third configuration can be set by the laser distance measuring device, in which third configuration the laser beam is aligned transversely to this vertical direction toward the side, i.e. for example in a horizontal direction. In the third configuration, a distance to the lateral boundary is measured. In this third configuration, which will be explained in more detail below, the laser distance measuring device can be used to perform further tasks in the elevator system beyond determining the current position of the elevator car.

The lateral boundary is thus also an object on which said laser beam impinges and to which the laser distance measuring device can measure the distance.

According to one specific embodiment, a mirror of the laser distance measuring device can be moved into a third mirror position in order to align the laser beam in the third mirror position in the third configuration.

In other words, the mirror which has already been mentioned above, by means of which the laser distance measuring device aligns the laser beam in the first or second configuration, or optionally another mirror can be positioned in the laser distance measuring device and configured in such a way as to align the laser beam in a so-called third mirror position in the third configuration, i.e. transversely to a vertical direction, in particular preferably horizontally.

The advantages already explained above, which can be achieved by deflecting the laser beam by means of a mirror, also apply in this case. In addition, the same mirror can particularly advantageously be used to be able to align the laser beam both in the first and second configurations and in the third configuration.

In particular, according to one specific embodiment, the mirror can be positioned and configured in such a way that it does not deflect the laser beam in the third mirror position.

In other words, the mirror and its spatial arrangement relative to the laser beam can be configured in such a way that the mirror can be moved into a third mirror position in which it does not influence or at least does not deflect the laser beam. For example, in the third mirror position, the mirror can be positioned and/or oriented in such a way that the laser beam does not impinge on its reflective surface. In particular, in the third mirror position, the mirror can be oriented so as to have its reflective surface parallel to the laser beam.

The optional property, whereby the laser distance measuring device is not only able to determine the vertical position of the elevator car along its travel path but also able to measure distances in a lateral, preferably horizontal direction, can be used for various purposes.

For example, according to one embodiment, the elevator system can have a plurality of lateral boundary markers arranged laterally next to the travel path at different heights along the travel path.

In other words, objects referred to herein as boundary markers can be located laterally next to the travel path along which the elevator car can move, on which objects the laser beam of the laser distance measuring device that is aligned in the lateral direction can impinge, so that the laser distance measuring device can thus measure the lateral distance of said markers with respect to its own position or indirectly with respect to the travel path of the elevator car.

The boundary markers can be used to mark particular local properties in the elevator system.

For example, boundary markers can be used to mark where, i.e. at which height position, a travel path of the elevator car is intended to be limited during normal operation of the elevator system, i.e. above which height positions the elevator car is not intended to be moved outside of maintenance work.

Alternatively or in addition, boundary markers can be used to mark where, i.e. at which height position, elevator shaft doors are provided along the travel path, for example.

Various other possibilities are conceivable for using boundary markers to be able to mark local conditions, for example in an elevator shaft of the elevator system, in such a way that they can be recognized by means of the laser distance measuring device.

In this case, according to one specific embodiment, the lateral boundary markers can be arranged at different horizontal lateral distances in relation to the travel path of the elevator car.

In other words, a plurality of different boundary markers can be arranged along the travel path of the elevator car, which boundary markers can be located at different height positions and are arranged at different horizontal distances from the travel path of the elevator car. For example, the boundary markers can be fixed to a shaft wall of an elevator shaft and in this case can be attached at different distances from the shaft wall. The boundary markers can therefore differ in particular with regard to their lateral distance and thus mark different local properties within the elevator system.

In this case, the laser distance measuring device can be used not only to recognize the different boundary markers, but also to distinguish them from one another on the basis of their different lateral distances, in order to be able to infer, for example, the different local properties marked by said markers.

For example, according to one specific embodiment, the elevator system can comprise one or a plurality of elevator shaft doors at different height positions along the travel path. In this case, a horizontal lateral distance, at which one of the lateral boundary markers which is arranged at one of the height positions, can correlate with a number of elevator shaft doors located at this height position.

In other words, elevator shaft doors are provided in an elevator system at different height positions along the travel path of the elevator car. Access between the elevator car stopped at a height position and a floor adjoining the elevator shaft door can be opened and closed via these elevator shaft doors. In many cases there is only one single elevator shaft door per floor. However, there are also configurations in which a plurality of elevator shaft doors are provided for one floor, i.e. at a single height position, which doors are intended to selectively allow access from the elevator car to different regions of a floor, for example.

In elevator systems of this kind, which are provided with a plurality of elevator shaft doors available at the same height, the lateral boundary markers proposed herein can be used to indicate how many elevator shaft doors are provided at a specific height position. For example, at a height position at which only a single elevator shaft door is provided, the boundary marker located there can be arranged at a different lateral distance than at a different height position at which, for example, two elevator shaft doors are provided.

The various lateral distances can differ from one another at least to such an extent that they can be differentiated by means of the laser distance measuring device. In other words, the differences in the lateral distances should be greater than a measurement inaccuracy of the laser distance measuring device.

By means of the lateral distance that can be measured by the laser distance measuring device in its third configuration, the boundary markers can thus be used to be able to determine information about local numbers of elevator shaft doors.

According to a further specific embodiment, each lateral boundary marker can have an upper end and a lower end. A region between the upper end and the lower end can in this case mark a region within which the elevator car may be subjected to level compensation during operation of the elevator system.

In other words, a boundary marker can have a particular length measured in the vertical direction. The boundary marker can in this case be arranged and dimensioned in such a way that its upper end and its lower end each mark the vertical limits of a region in which, during operation of the elevator system, the elevator car may be moved slightly as part of level compensation, even though its doors are not closed. Level compensation of this kind can be necessary and permissible if, for example, a load in the elevator car suddenly changes, for example because a number of passengers get on or off, and the current position of the elevator car thereby changes slightly, in particular as a result of changes in length of the suspension means holding the elevator car. Level compensation is intended to prevent a step from forming between a base of the elevator car and an adjacent base within the floor. In order to prevent this, the elevator car may exceptionally be moved slightly, contrary to the otherwise applicable regulations, despite the doors being open.

However, in order to minimize risks for passengers in particular in this case, the region within which level compensation may take place must be limited. With the approach presented here, this region can be marked by means of boundary markers and in particular by means of dimensioning and positioning these boundary markers so that it is possible to detect said region by means of measuring the lateral distance to one of these boundary markers, which measurement can be carried out by the laser distance measuring device.

While level compensation is being carried out, the position information that can be determined by means of the laser distance measuring device in its first and/or second configuration can be sufficiently accurate to move the elevator car to a target height position on the basis of this position information, at which target height position the base of said car is flush with a base of the adjoining floor, for example.

It should be noted that some of the possible features and advantages of the invention are described herein with reference to different embodiments of an elevator system and in particular of a laser distancing measuring device provided therein. A person skilled in the art will recognize that the features can be suitably combined, adapted or replaced in order to arrive at further embodiments of the invention.

Embodiments of the invention will be described in the following with reference to the accompanying drawing, with neither the drawing nor the description being intended to be interpreted as limiting the invention.

DESCRIPTION OF THE DRAWINGS

FIG. 1 shows an elevator system according to an embodiment of the present invention.

The drawing is merely schematic and is not to scale.

DETAILED DESCRIPTION

FIG. 1 shows an elevator system 1 according to an embodiment of the present invention. The elevator system 1 comprises, inter alia, an elevator car 3 and a counterweight 5, which are accommodated within an elevator shaft 7. The elevator car 3 and the counterweight 5 are suspended within the elevator shaft 7 via belt-like suspension means 9 and are connected to one another. The suspension means 9 can be moved by a drive machine 11. The drive machine 11 is controlled by an elevator controller 15. As a result, the elevator car 3 can be moved vertically along a travel path 13 within the elevator shaft 7. The travel path 13 is delimited at the top by a ceiling of the elevator shaft 7, which acts as an upper boundary 17, and at the bottom by a base, which acts as a lower boundary 19.

In order to be able to determine a current position of the elevator car 3 within the elevator shaft 7, a laser distance measuring device 21 is mounted on the elevator car 3.

In the example shown, the laser distance measuring device 21 is arranged on a roof 23 of the elevator car 3. The laser distance measuring device 21 has a laser 25 that emits a laser beam 27. The laser distance measuring device 21 is configured to detect portions of the emitted laser beam 27 that impinge on an object and are reflected back or backscattered by said object, and to determine therefrom a distance to the position of the object.

However, the laser distance measuring device 21 is not configured such that its laser 25 emits the laser beam 27 directly to the upper or lower boundary 17, 19 and thus measures a distance to one of these boundaries 17, 19. Instead, the laser distance measuring device 21 is configured such that the laser beam 27 generated therein can be directed upward toward the upper boundary 17 in a first configuration and downward toward the lower boundary 19 in a second configuration. Accordingly, both a distance to the upper boundary 17 and to the lower boundary 19 can be measured by means of the laser distance measuring device 21. A current position of the laser distance measuring device 21 and thus of the elevator car 3 connected thereto within the elevator shaft 7 can thus be determined in two ways, i.e. redundantly.

For this purpose, the laser distance measuring device 21 has, for example, a mirror 29 by means of which the laser beam 27 initially emitted horizontally by the laser 25 can be deflected vertically upward or vertically downward.

In the example shown, the mirror 29 can be rotated about an axis of rotation 31 such that it can be rotated into a first mirror position 33' and into a second mirror position 33", as can be clearly seen in the enlarged partial view in FIG. 1. In the first mirror position 33', the mirror 29 is inclined, i.e. in the example shown at a 45° angle, with respect to the original direction of propagation of the laser beam 27, i.e. in the example shown with respect to the horizontal, such that the laser beam 27 is then directed upward toward the upper boundary 17 as laser beam 27'. In the second mirror position 33", the mirror 29 is inclined in the opposite direction (as shown in dashed lines), i.e. in the example shown at a −45° angle, with respect to the original direction of propagation of the laser beam 27, such that the laser beam 27 is then directed downward toward the lower boundary 19 as laser beam 27". The laser distance measuring device 21 or its mirror 29 is in this case configured and positioned such that the laser beam 27", in the second configuration, can extend past laterally next to the elevator car 3, i.e. through a gap between the elevator car 3 and a side wall 39 of the elevator shaft 7, in order to then be able to reach the lower boundary 19.

In addition, in a third configuration, the laser distance measuring device 21 can be configured in such a way that the laser beam 27 is directed toward a lateral boundary 37 next to the travel path 13 as laser beam 27'''. In the example shown, the mirror 29 can be rotated into a third position 33''' for this purpose (as shown by dash-dotted lines in the enlarged section from FIG. 1). In this third position 33''', the mirror 29 does not deflect the laser beam 27, and therefore the laser beam extends as laser beam 27''' in the original direction, i.e. in the example shown in the horizontal direction, further toward the lateral boundary 37, i.e. transversely, in particular perpendicularly, to a side wall 39 of the elevator shaft 7.

In this third configuration, the laser distance measuring device 21 can be used to measure a lateral distance, i.e. a distance in the horizontal direction, toward the side wall 39 or toward boundary markers 35 arranged on the side wall 39. The boundary markers 35 thus form the lateral boundaries 37 and can be used in this case to provide additional information that may be important for operating the elevator system 1, within the elevator shaft 7.

For example, different boundary markers 35 can be provided at different height positions along the travel path 13 in order to practically codify local properties of the elevator system 1.

For this purpose, the boundary markers 35 can be arranged, for example, at different horizontal lateral distances in relation to the travel path 13 of the elevator car 3. In other words, a surface of one of the boundary markers 35 that is directed toward the travel path 13 can be arranged, for example, at a different distance from the side wall 39 and thus also from the travel path 13 than an identically or similarly aligned surface of another boundary marker 35. Since the different lateral distances can be measured by means of the laser distance measuring device 21, information can thus be codified that can be read out by the laser distance measuring device 21.

Alternatively, different numbers of boundary markers 35 can be arranged one above the other at a height position. A free space or slit can remain between adjacent boundary markers 35. By means of the laser distance measuring device 21, the individual boundary markers 35 and the free spaces remaining between them can be recognized as a result of the different lateral distances, and thus the number of boundary markers 35 can be determined, and therefore information that can be read out by the laser distance measuring device 21 can also be codified in this way.

The boundary markers 35 can be implemented, for example, by means of metal sheets that are mounted on the side wall 39 of the elevator shaft 7. These metal sheets can then be mounted at different distances from the side wall 39, depending on the information to be codified. Alternatively or in addition, the metal sheets can have different numbers of preferably horizontal slits or a plurality of metal sheets can be arranged one above the other, in order, for example, to codify information for the laser distance measuring device 21 in a readable manner by means of the number of slits or free spaces.

Alternatively or in addition, the boundary markers 35 or metal sheets used to implement said boundary markers can also have a contoured surface, along which the lateral distance between the travel path 13 and the contoured surface varies. Information for the laser distance measuring device 21 can therefore again be coded in a readable manner using this type of varying contoured surface.

For example, one or a plurality of elevator shaft doors 41 can be provided in the elevator system 1 at different height positions. The boundary markers 35 can then be used to codify the number of elevator shaft doors 41 present locally.

The boundary markers 35 can also have an upper end 43 and a lower end 45. A region between the upper end 43 and the lower end 45 can in this case mark a region within which the elevator car may carry out level compensation, controlled by the elevator controller 15, during operation of the elevator system. The laser distance measuring device 21 can recognize the upper end 43 and the lower end 45, for example on the basis of a changing lateral distance there.

The laser distance measuring device 21 can transmit the distances measured thereby, in particular the lateral distances measured thereby, to the elevator control 15 continuously or at short time intervals. For this purpose, wired or wireless data communication 47 can be established between the two components.

The distances measured by the laser distance measuring device 21 can be used both during normal operation of the elevator system 1 and during a learning phase.

During normal operation, the vertical distances measured in the first and/or second configuration can be used to infer the current position of the elevator car 3 within the elevator shaft 7. Moreover, in the third configuration, the information codified, for example by means of the boundary markers 35, can be read out by measuring the horizontal distances, i.e. measuring lateral distances. Relevant information can be forwarded to the elevator controller 15 and then evaluated therein in order to control the elevator system 1 accordingly.

Properties of the elevator system 1 can be learned during a learning phase which precedes normal operation of the elevator system 1. For this purpose, the elevator car 3, together with its laser distance measuring device 21, can be moved along preferably the entire travel path 13 through the elevator shaft 7 and in so doing the information codified for example by the boundary markers 35 can be recorded.

With the elevator system 1 proposed herein, a learning run can be carried out significantly faster than was the case with conventional elevator systems. This may be due, inter alia, to the fact that vertical distances to the upper boundary 17 and the lower boundary 19 can be determined by means of the laser distance measuring device 21 even before the start of the learning run, so that these can already be taken into account during the learning run. In conventional elevator systems, however, it was common for an upper and lower end of the travel path 13 not to be known in advance, but instead these had to be learned during the learning run, for example by detecting markings provided at corresponding height positions within the elevator shaft. In conventional elevator systems, it was therefore usually necessary to carry out the learning run at a greatly reduced speed, for example at a speed of only 0.3 m/s or less, which, in particular in the case of very tall elevator systems, resulted in a considerable amount of time being required for the learning run. With the elevator system 1 presented here, learning runs can be carried out at a significantly higher speed, for example at the nominal speed that is usual during operation of the elevator system, whereby the time required to carry out the learning runs can be considerably reduced. Furthermore, when using a laser distance measuring device as opposed to using a magnetic tape to determine the position of the elevator car, the costs are advantageously independent of the height of the elevator shaft.

Finally, it should be noted that terms such as "comprising", "having", etc. do not preclude other elements or steps, and terms such as "a" or "an" do not preclude a plurality. Furthermore, it should be noted that features or steps that have been described with reference to one of the above embodiments may also be used in combination with other features or steps of other embodiments described above.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. An elevator system comprising:

an elevator car movable along a travel path delimited at a top of the travel path by an upper boundary and delimited at a bottom of the travel path by a lower boundary;

a laser distance measuring device emitting a laser beam and being adapted to determine a distance to a position at which the laser beam impinges on an object from a portion of the laser beam that is reflected back or backscattered by the object; and wherein the laser distance measuring device is mounted on the elevator car and is operable to change a direction of the laser beam to direct the laser beam upward toward the upper boundary in a first configuration and to direct the laser beam downward toward the lower boundary in a second configuration, whereby the laser distance measuring device determines a distance to the upper boundary when in the first configuration and determines a distance to the lower boundary when in the second configuration.

2. The elevator system according to claim 1 wherein the laser distance measuring device includes a mirror movable between a first mirror position and a second mirror position, the mirror in the first mirror position aligning the laser beam according to the first configuration and the mirror in the second mirror position aligning the laser beam according to the second configuration.

3. The elevator system according to claim 2 wherein the mirror is rotatable about a horizontal axis of rotation to move between the first mirror position and the second mirror position.

4. The elevator system according to claim 2 wherein the laser distance measuring device is operable to direct the laser beam toward a lateral boundary next to the travel path in a third configuration and to determine a distance to the lateral boundary when in the third configuration.

5. The elevator system according to claim 4 wherein the mirror is movable into a third mirror position thereby aligning the laser beam according to the third configuration.

6. The elevator system according to claim 5 wherein the mirror does not deflect the laser beam when in the third mirror position.

7. The elevator system according to claim 1 including a plurality of boundary markers arranged laterally next to the travel path at different heights along the travel path and wherein the laser distance measuring device is operable to determine a lateral distance to each of the boundary markers.

8. The elevator system according to claim 7 wherein the boundary markers are arranged at different horizontal lateral distances in relation to the travel path.

9. The elevator system according to claim 8 wherein the elevator system includes a plurality of elevator shaft doors at different height positions along the travel path and wherein the horizontal lateral distance at which one of the boundary markers is arranged correlates with a number of the elevator shaft doors located at the height of the one boundary marker along the travel path.

10. The elevator system according to claim 7 wherein each of the boundary markers has an upper end and a lower end and wherein for each of the boundary markers a region between the upper end and the lower end thereof marks a region within which the elevator car can be subjected to level compensation during operation of the elevator system.

11. An elevator system comprising:

an elevator car movable along a travel path delimited at a top of the travel path by an upper boundary and delimited at a bottom of the travel path by a lower boundary;

a laser distance measuring device emitting a laser beam and being adapted to determine a distance to a position at which the laser beam impinges on an object from a portion of the laser beam that is reflected back or backscattered by the object, the laser distance measuring device including a mirror movable among a first mirror position, a second mirror position and a third mirror position;

wherein the laser distance measuring device is mounted on the elevator car and is operable among a first configuration, a second configuration and a third configuration;

wherein the laser distance measuring device, when in the first configuration, moves the mirror to the first mirror position whereby the mirror directs the laser beam upward toward the upper boundary and wherein the laser distance measuring device determines a distance to the upper boundary;

wherein the laser distance measuring device, when in the second configuration, moves the mirror to the second mirror position whereby the mirror directs the laser beam downward toward the lower boundary and wherein the laser distance measuring device determines a distance to the lower boundary; and wherein the laser distance measuring device, when in the third configuration, moves the mirror to the third mirror position to direct the laser beam toward a lateral boundary next to the travel path and to determine a distance to the lateral boundary, and wherein the mirror does not deflect the laser beam when the mirror is in the third mirror position.

12. The elevator system according to claim 11 wherein the mirror is rotatable about a horizontal axis of rotation to move among the first mirror position, the second mirror position and the third mirror position.

* * * * *